(12) United States Patent
McNulty

(10) Patent No.: US 11,628,915 B1
(45) Date of Patent: Apr. 18, 2023

(54) ELECTRONIC SAIL SHAPE SENSOR NETWORK

(71) Applicant: Sean McNulty, Triangle, VA (US)

(72) Inventor: Sean McNulty, Triangle, VA (US)

( * ) Notice: Subject to any disclaimer, the term of this patent is extended or adjusted under 35 U.S.C. 154(b) by 587 days.

(21) Appl. No.: 16/655,187

(22) Filed: Oct. 16, 2019

Related U.S. Application Data

(60) Provisional application No. 62/746,548, filed on Oct. 16, 2018.

(51) Int. Cl.
*B63B 49/00* (2006.01)
*G01L 5/13* (2006.01)
*B63H 9/067* (2020.01)

(52) U.S. Cl.
CPC ............ *B63B 49/00* (2013.01); *B63H 9/067* (2020.02); *G01L 5/133* (2013.01)

(58) Field of Classification Search
CPC .. B63B 49/00; B63H 9/00; B63H 9/06; B63H 9/067; G01L 5/133
USPC .......................................................... 701/21
See application file for complete search history.

(56) References Cited

U.S. PATENT DOCUMENTS

| | | | | |
|---|---|---|---|---|
| 6,308,649 | B1 * | 10/2001 | Gedeon | B63B 49/00 701/21 |
| 10,118,670 | B2 * | 11/2018 | Chatterton | G01L 5/047 |
| 2012/0101669 | A1 * | 4/2012 | Spanhake | B63H 9/06 701/21 |
| 2019/0039706 | A1 * | 2/2019 | Tapp | B63H 9/06 |

\* cited by examiner

*Primary Examiner* — Lars A Olson
(74) *Attorney, Agent, or Firm* — Tangent Law Group, PLLC; Eric J. Weierstall, Esq.

(57) ABSTRACT

The instant invention describes devices and methods of measuring the differential air pressure at numerous representative points across the surface of the sail and providing visual feedback of areas of ideal laminar flow and areas of less than optimal airflow with an indication of how the sail must be adjusted to create the maximal differential in airflow. The invention utilizes an array of sensors that detect minute variations in barometric pressure and other data on each side of the sail surface. These sensors are connected together to form a network or net across the sail. This connection can be physical, using wires, or it may be wireless, using for example, but certainly not being limited to, Bluetooth LE 5.0 or other wireless topologies or technologies. Finally it may utilize a combination of wired and wireless connections to fit individual situations and may couple with existing terrestrial and satellite ship networks.

3 Claims, 6 Drawing Sheets

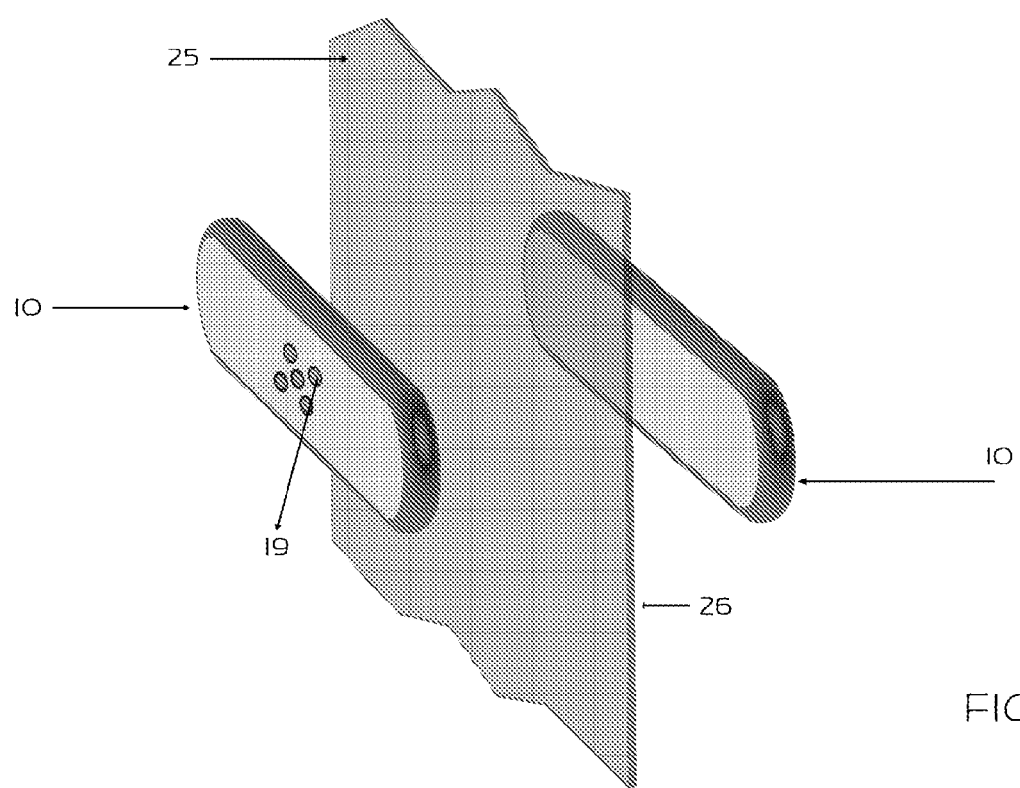
FIG. IC

ELECTRONIC SAIL SHAPE SENSOR NETWORK

BACKGROUND OF THE INVENTION

Sailboats usually have a number of sails, broadly meaning cloth, canvas, Kevlar, composites or other fabric that flexes and/or articulated and non-articulated wings, hereafter referred to simply as sails that serve as a source of propulsion. In order to achieve the highest efficiency from a sail, the sails must be "trimmed" or adjusted via a number of controls to optimize sail shape for any given environmental condition. These conditions change frequently and trim control adjustments are made to maintain the maximum efficiency in the propulsion of the boat.

These controls typically comprise a number of ropes, or lines, or "sheets" in sailing terms, that tighten or loosen the sail from its front edge to its rear edge (luff to leech) or apply tension vertically from the top of the sail to the bottom (head to foot). Sails are designed to take advantage of the Bernoulli principle and other physical principals, similar to airplane wings, essentially creating an idealized airfoil. By varying the shape of the sail such that it has camber from front to back the profile for the given sail can be idealized for the wind conditions and position of the boat relative to the direction of the wind. Typically, the more camber, the more forward thrust and opposing drag is created, up to a point where the induced drag becomes sufficient to be detrimental. Additionally, the sail must be situated at an angle about its vertical axis so as to create an "angle of attack" relative to the apparent wind. At angles of attack that are too great, the sail "stalls". At the proper angle of attack, laminar airflow over the greatest front to back distance over the sail is created, producing optimum forward thrust. Though similar to airplane wings in general principal, the deployment of the sail at a single altitude and mounted to the sailboat in a different fashion as well as the ability of the typical fabric sail to more quickly and efficiently change camber coupled with the difference in safety factors makes the problem addressed by the invention more unique to sailing.

The proper laminar airflow over the airfoil or sail creates maximum air pressure on the "inside" surface of the sail and minimal air pressure on the "outside" of the surface of the sail. This pressure differential is responsible for lift or forward thrust induced by the sail. The greater the differential across the maximal area of the sail, the greater the thrust produced. Thus by trimming the sail and adjusting the camber to maximize laminar flow over the sail, maximum thrust is produced.

To achieve proper sail shapes and allow for the idealized trim of the sail, sail makers design the sail such that they have the proper basic shape with respect to camber and such that maximum camber is typically in the forward 40 to 50% range from front to back. The position of this maximum camber can be adjusted to some degree on most sails. Sailmakers also typically sew into the sail small strips of yarn or ribbon that flow rearward when airflow is ideal across a portion of the sail. These are referred to as "telltales", "woolies" and other names based on the region being sailed.

Obtaining the ideal sail shape in current conditions is often left to the experience of the captain and crew and visualizing the angle of attack and the laminar nature of the flow on the sail which has typically been done by observing the shape of the sail and the flow of the telltales. This combined with adjustments and/or selection of the initial camber of the sail allow experienced crews to attempt to maximize thrust from their boat.

However, there are significant limitations in these methods in that they rely on subjective reasoning and visual clues that are not very accurate or representative of the ideal laminar airflow across the entire surface of the sail. Existing methods and models infer but do not directly measure airflow across the surface. Moreover, as they infer the measure of airflow, either by observation via the human eye or camera systems which rely on indicators on the sails, the ability to fully and quickly visualize the state of the sail or how one sail affects the others is very difficult and requires significant experience with the sail package, the boat, and the craft of sailing. A need exists to assist experienced and inexperienced crews alike to visualize in real time the pressure changes on the sale and idealized trim settings to improve the performance of sails.

The instant invention describes devices and methods of measuring the differential air pressure at numerous representative points across the surface of the sail and providing visual feedback of areas of ideal laminar flow and areas of less than optimal airflow with an indication of how the sail must be adjusted to create the maximal differential in airflow.

The invention anticipates eventual interface with sail controls in an automated fashion using existing shipboard data networks. One such purpose would be to allow for automated trimming of sails which would provide for the greatest efficiency from deployed sails in racing, pleasure, and commercial settings. A further aspect of the invention would be for use in sail designing and the interaction of airflow over multi-sail rigs. A still further aspect would be to provide for an interface and/or readout to experienced crews such that the entirety of the sail may be monitored and adjustments made more expediently.

BRIEF DESCRIPTION OF THE FIGURES

Non-limiting exemplary embodiments of the invention are explained in greater detail by way of the drawings, where the same reference numerals refer to the same features.

FIG. 1C shows a horizontal installation of an exemplary embodiment of the instant invention with a sensor on a front or windward face of a sale and a sensor on the back or leeward side of the sail.

DETAILED DESCRIPTION OF AN EXEMPLARY EMBODIMENT OF THE INVENTION

Figure 1A:
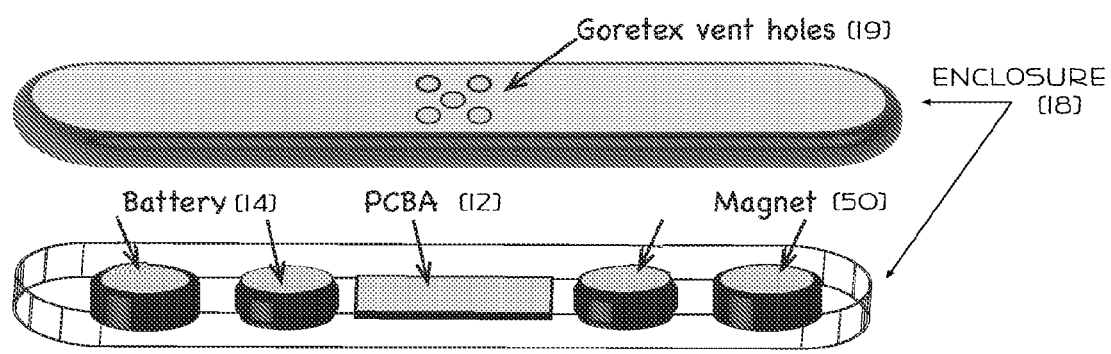
FIG. 1A shows an exploded view of an exemplary embodiment of the invention.

The figures show plan and sectional views of an exemplary embodiment of the sail monitoring system, the individual sensor devices, and the general operation of same as well as existing sails tell tale locations.

The invention utilizes an array of sensors 10 that detect minute variations in barometric pressure and other data on each side of the sail surface. These sensors 10 are connected together to form a network or net 100 across the sail. This connection can be physical, using wires, or it may be wireless, using for example, but certainly not being limited to, Bluetooth LE 5.0 or other wireless topologies or technologies. Finally it may utilize a combination of wired and wireless connections to fit individual situations and can couple with existing terrestrial and satellite ship networks. The sail sensor network 100 is connected to one or more nodes or sensors 10 that collect the raw data and in a non-limiting exemplary embodiment transmit it using Bluetooth or other wireless networking technology to a computing device, such as a smartphone, tablet computer, or other device that has the computing power to provide the user with a visual representation of the data and indicates the state of the sail. A further version of the interface can also suggest the necessary action to correct any imbalance in differential pressure. These systems can be located onboard, in a support vessel, or ashore.

A further aspect of the invention is the ability to sense emergency conditions and adjust the boat to remain stable. Recently, competitive sailing, notably the upcoming presentation of the 36$^{th}$ Americas Cup in 2021, has added foiling arms to the specifications of the boats. This presents several challenges in addition to the importance of accurately determining the amount of thrust being generated by the sails. Foiling sailboats ride on hydrofoil like foil arm extensions and can very easily slip into dangerous instability at a wide range of speeds. Once the boat is outside its performance envelope it can become very dangerous to the crew very quickly. The instant invention further allows for the transmission of adjustments to the control surfaces of the foiling sailboat, for instance winches and steering elements, in a timely manner to avoid unstable conditions. Using predetermined accelerometer data safety cutoffs the accelerometer data detected over the sensor network can be detected in the exemplary embodiment and remediate the controls based on early indicators (e.g. wobble, porpoise etc.) of instability and keep the boat inside the designed performance envelope.

Adjustments to the various control surfaces of the boat 1 can include but are not limited to, easing or tightening of sail trim lines 40 on the sail 20,30 mounted to the mast 2 changing the sail(s) 20,30 shape to increase or decrease the acceleration power or thrust. We can also control the heading and direction of the boat in relation to the wind by heading up or falling off (relative to wind) typically through rudder controls. And in the case of boats with foiling arms noted above, the foils on the arms. Using these control systems and other measures we expect to be able to prevent or at least minimize the impact of catastrophic performance of the foils that can lead to high speed crashes and systemic failures.

The figures show plan and sectional views of an exemplary embodiment of the sail monitoring system, the individual sensor devices, and the general operation of same as well as existing sails tell tale locations.

Figure 1B:
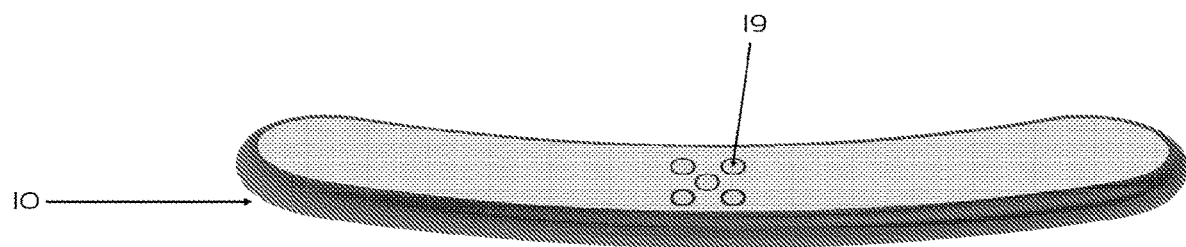
FIG. 1B shows an assembled view showing the flexibility of the enclosure of the instant invention.
Figure 1D:
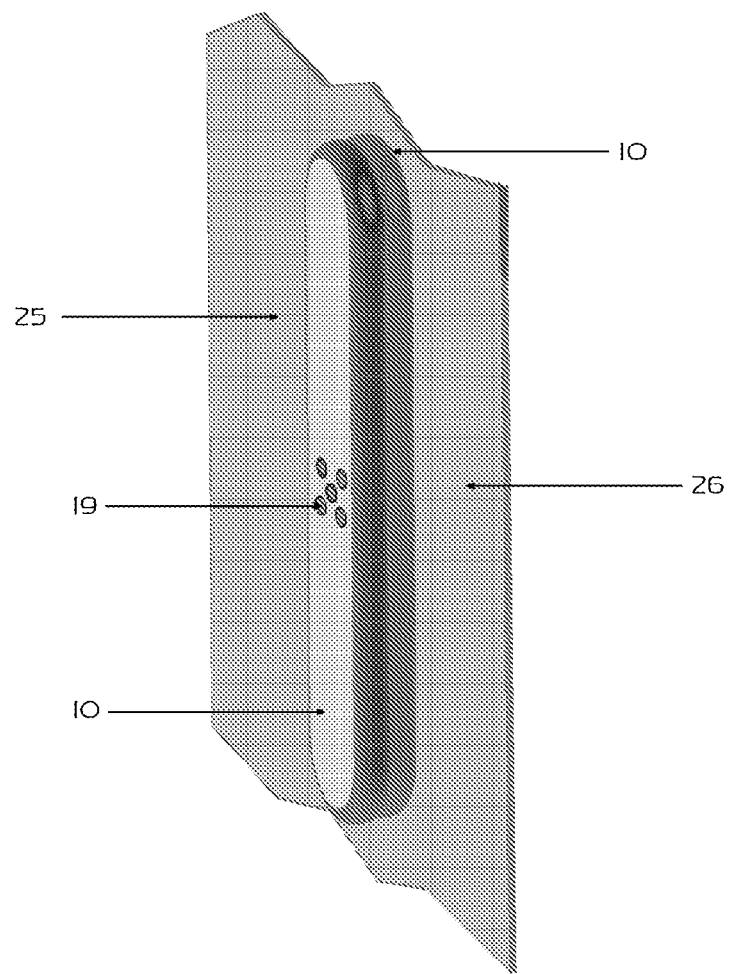
FIG. 1D shows a vertical installation of the exemplary embodiment of FIG. 1C.
Figure 2:
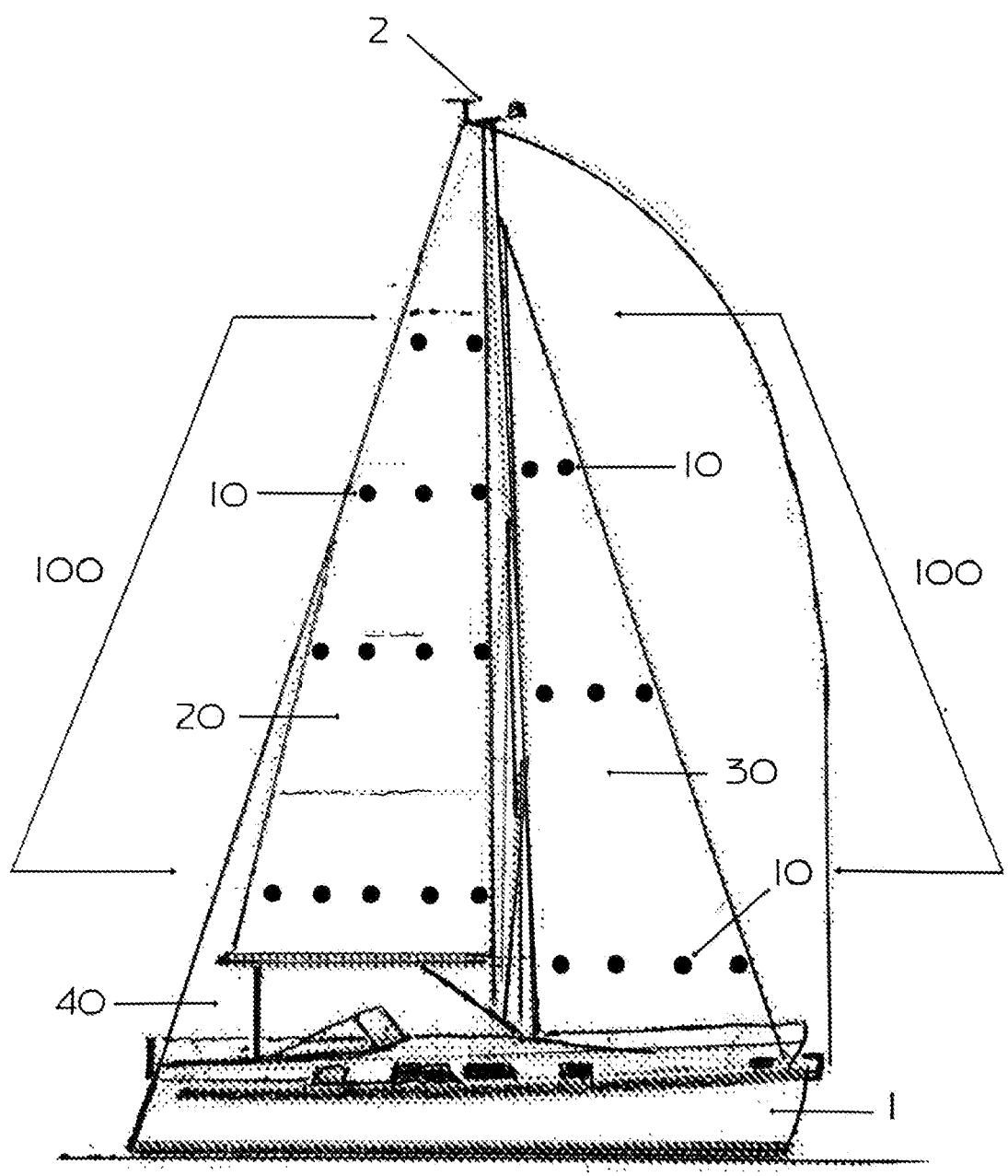
FIG. 2 shows a plan view of the sensor network installed in an exemplary embodiment on a working sail.

In one design, shown as the non-limiting exemplary embodiment of the drawings in FIGS. 1A-2, the sensors are MEMS barometric pressure sensors mounted or attached in pairs, on opposite sides of sail 20, in this instance on the front or windward 25 side and back or leeward side 26, of each other in a number of locations about the sail(s) 20,30, each with its own circuit board 12, battery 14, and transmitter 16. Each would transmit its data to a master node, which can be the computing device or another transmitter.

Figure 3:
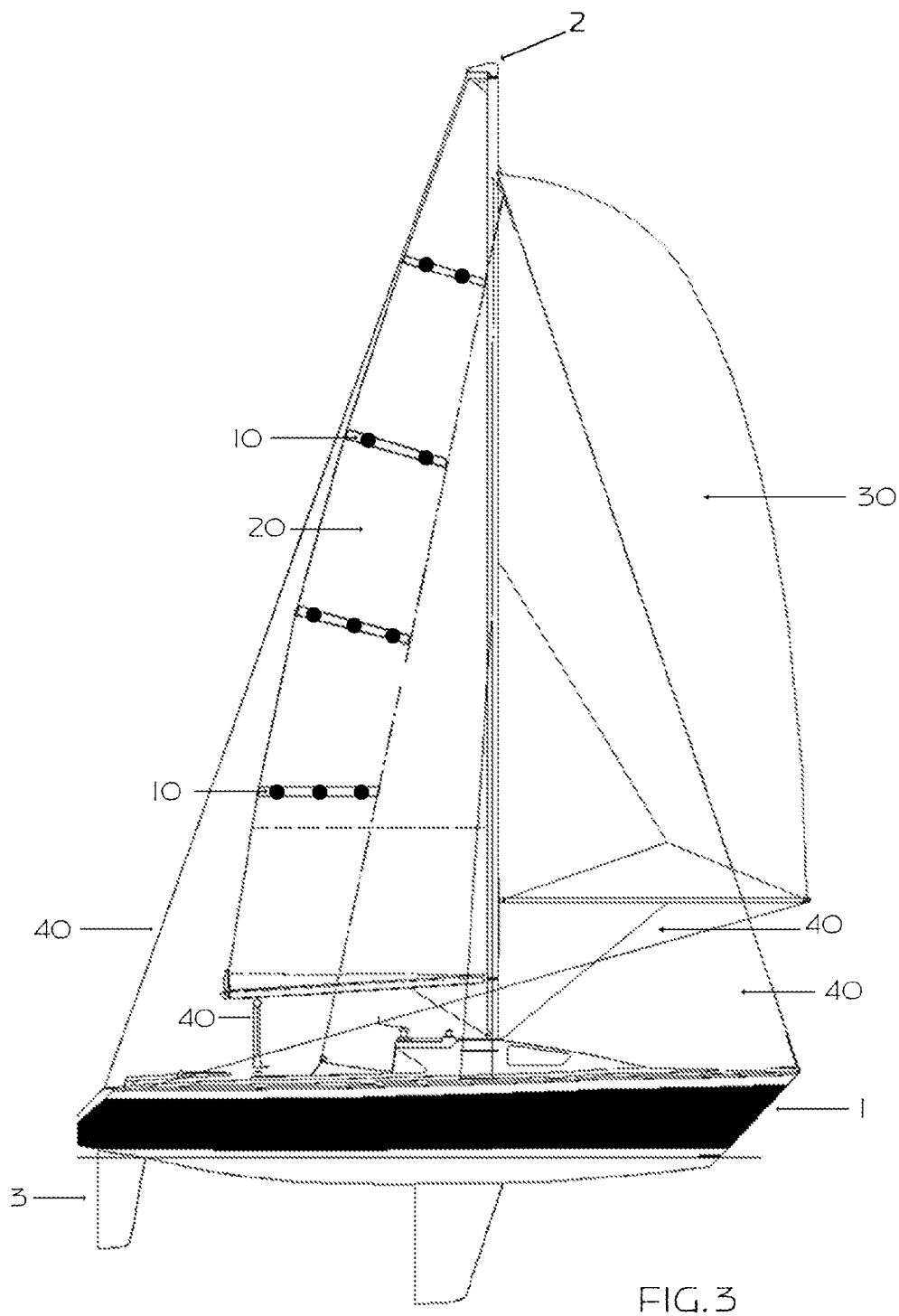
FIG. 3 shows a further view of a similar multi-sail rigged sailboat with an exemplary embodiment of the sensor network installed.

In another design, the sensors 10 can be arranged in a strip of material that can be rubber or thermoplastic material, or fabric such that the strip can be attached to the sail from front to back, from top to bottom, or some other orientation on the sail, as shown in FIG. 3. The material will be designed such that the sail can be "furled" or wrapped around a pole or wire inside of the mast, boom or forestay of the boat so that it does not interfere with proper airflow or operation of the sail.

The individual sensors 10, which can be for instance MEMS barometric sensors, or other types of sensor that can provide the data required and not significantly interfere with the sails performance, are connected along the length of the strip in known intervals and are connected to a node at the end of the strip which contains a main circuit board, battery, and transmitter or provides a method of connection to another strip oriented roughly perpendicularly to the first strip that then leads to a single master node which contains the main circuit board, battery, and transmitter. In both cases, a number of sensor strips or packs can be applied across the surface of the sail to provide the desired density of sensor coverage across the surface of the sail.

The strips can be attached to the surface of the sail(s) 20,30 by attachment devices such as the non-limiting exemplary embodiment shown with magnets 18, or may include adhesives or can be sewn onto the surface of the sail or laminated into the sail cloth itself.

The invention includes the ability, in the form of analytical software and the required algorithms stored on the computing device, to provide a visual representation, in real-time or collected for subsequent analysis, of the sail, aerofoil, or winged surface to the user such that the areas of ideal and less than ideal pressure differential readings are discernible.

The invention will also allow for the heretofore unknown capability of being able to precisely describe the interaction of one or more sails 20, 30 and the airflows moving across them and how they interact. For example, the effect of sail position relative to one another and wind exiting the forward sail 30 on laminar flow or in turbulence and the effect of the condition of wind over another trailing or aft sail 20 or wing surface.

The embodiments and examples discussed herein are non-limiting examples. The invention is described in detail with respect to non-limiting exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. An electronic sail shape network comprising:
   at least one sensor mounted on a sail on a boat;
   an at least one transceiver sending and receiving signals on the at least one sensor and transmitting data;
   an at least one data processing unit;
   an at least one network created at least in part by the at least one sensor and the data processing unit; and
   an at least one program stored on the network and communicating with the processing unit calculating a sail shape from the transmitted data, wherein the at least one sensor is mounted on the sail in pairs and detects barometric pressures and thereby the difference in the barometric pressure between a windward and leeward side of the sail reporting the data to a computing device which provides a visual representation in real-time of the sail surface to a user such that the areas of ideal and less than ideal pressure differential readings are discernible and overall pressure on the sail is displayed in real time.

2. The sail shape network of claim 1, further comprising an at least one further sensor for calculating a resulting propulsive thrust from the sail and communicating with the network.

3. The sail shape network of claim 2, wherein the further sensor includes an at least one accelerometer and the at least one accelerometer detects and transmits data to the data processing unit such that the data processing unit detects when an out of control condition is imminent in the boat.

* * * * *